(12) United States Patent
Patel et al.

(10) Patent No.: US 8,927,620 B2
(45) Date of Patent: Jan. 6, 2015

(54) COLOR-CHANGING WOOD FILLING COMPOSITION

(71) Applicants: Yogeshbhai Patel, Columbus, OH (US); Van R. Foster, Columbus, OH (US)

(72) Inventors: Yogeshbhai Patel, Columbus, OH (US); Van R. Foster, Columbus, OH (US)

(73) Assignee: Elmer's Products, Inc., Westerville, OH (US)

( * ) Notice: Subject to any disclaimer, the term of this patent is extended or adjusted under 35 U.S.C. 154(b) by 49 days.

(21) Appl. No.: 13/832,989

(22) Filed: Mar. 15, 2013

(65) Prior Publication Data

US 2014/0275327 A1 Sep. 18, 2014

(51) Int. Cl.
*C08L 25/04* (2006.01)
*C08K 13/02* (2006.01)
*C08L 13/02* (2006.01)

(52) U.S. Cl.
CPC ...... *C08K 13/02* (2013.01); *C08L 13/02* (2013.01)
USPC ...................................................... 523/122

(58) Field of Classification Search
CPC ....... C08L 97/02; C08L 25/04; A61K 6/0038; A61K 2800/45
USPC ...................................................... 523/122
See application file for complete search history.

(56) References Cited

U.S. PATENT DOCUMENTS

| | | | | |
|---|---|---|---|---|
| 3,660,324 A | * | 5/1972 | Onchi | 524/72 |
| 6,512,027 B2 | * | 1/2003 | Kanai et al. | 523/511 |
| 7,449,503 B2 | * | 11/2008 | Senturk | 523/218 |
| 7,993,732 B2 | * | 8/2011 | Sasaki et al. | 428/212 |
| 8,871,867 B2 | * | 10/2014 | Cheng et al. | 525/105 |
| 2011/0021672 A1 | * | 1/2011 | Crews et al. | 524/60 |

FOREIGN PATENT DOCUMENTS

EP 2 452 987 A1 * 5/2012
WO WO 00/66508 * 11/2000

OTHER PUBLICATIONS

Trade sheet from OSHA from the Internet May 18, 2014 https://www.osha.gov/dts/chemicalsampling/data/CH_273993.html.*

* cited by examiner

*Primary Examiner* — Nathan M Nutter
(74) *Attorney, Agent, or Firm* — McNees Wallace & Nurick LLC

(57) ABSTRACT

A composition for use as a wood-filler that includes at least two modified styrene butadiene latexes; at least one pH color indicator, wherein the pH color indicator is operative to provide a visual indication that the wood filling composition is dry; and microspheres, wherein the microspheres further include glass or ceramic, and wherein the microspheres are operative to provide durability and stainability to the wood-filling composition.

13 Claims, No Drawings

COLOR-CHANGING WOOD FILLING COMPOSITION

BACKGROUND OF THE INVENTION

The described invention relates in general to compositions for repairing wood and similar surfaces, and more specifically to a wood-filling composition that includes a color-based indicator of dryness.

Current wood fillers are often tinted to match a particular color of a wood surface that requires repair or so the consumer may stain the repaired area to a desired color. However, current commercially available wood fillers do not provide the consumer with an accurate indicator of dryness so that sanding for eventual staining can be performed. Thus, in most cases, the consumer must wait for a predetermined period of time before sanding and staining or simply guess the appropriate time for such activity. Because an incorrect guess can result in an incomplete repair or unacceptable repair quality, there is an ongoing need for a wood-filling composition that includes an accurate visual indicator of dryness.

SUMMARY OF THE INVENTION

The following provides a summary of certain exemplary embodiments of the present invention. This summary is not an extensive overview and is not intended to identify key or critical aspects or elements of the present invention or to delineate its scope.

in accordance with one aspect of the present invention, a first wood-filling composition is provided. This composition includes at least one modified styrene butadiene latex; at least one pH color indicator, wherein the pH color indicator is operative to provide a visual indication that the wood filling composition is dry; and microspheres, wherein the microspheres further include glass or ceramic, and wherein the microspheres are operative to provide durability and stainability to the wood-filling composition.

In accordance with another aspect of the present invention, a second wood-filling composition is provided. This composition includes at least two modified styrene butadiene latexes; at least one pH color indicator, wherein the pH color indicator is operative to provide a visual indication that the wood filling composition is dry; and microspheres, wherein the microspheres further include glass or ceramic, and wherein the microspheres are operative to provide durability and stainability to the wood-filling composition.

In yet another aspect of this invention, a third wood-filling composition is provided. This composition includes at least two modified styrene butadiene latexes; at least one pH color indicator, wherein the pH color indicator is operative to provide a visual indication that the wood filling composition is dry; microspheres, wherein the microspheres further include glass or ceramic, and wherein the microspheres are operative to provide durability and stainability to the wood-filling composition; and at least one pigment.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the associated descriptions are to be regarded as illustrative and not restrictive in nature.

DETAILED DESCRIPTION OF THE INVENTION

Exemplary embodiments of the present invention are described below. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to a wood-filling composition that includes a visual indicator of dryness and that further includes styrene butadiene rubber (SBR) polymers and glass or ceramic microspheres that provide superior product performance, primarily with regard to durability and stainability. The visual indicator is based on pH and when the wood filler of the present invention changes color (e.g., purple to white, magenta to beige, etc.) the repaired area can then be further processed, e.g., sanded and painted or stained.

A first exemplary formulation includes the following ingredients: water; a pH controller such as AMP™-95 manufactured by The Dow Chemical Company; a non-ionic surfactant such as Burco® APR-4007 manufactured by Burlington Chemical Co., LLC; a dispersant or anionic detergent polymer such as Burcosperse® AP Liquid manufactured by Burlington Chemical Co., LLC); a freeze-thaw stabilizer such as propylene glycol; a first SBR polymer such as the modified styrene butadiene latex Encor® DL 215 manufactured by Arkema, Inc.); a second SBR polymer such as the modified styrene butadiene latex Encor® DL 313 manufactured by Arkema, Inc.; a bactericide that includes aqueous blends of chlorinated and non-chlorinated isothiazolinones and 2-bromo-2-nitro-1,3-propanediol such as Acticide® LA manufactured by Thor, Inc.; a mildewcide that includes liquid octylisothiazolinone such as Acticide® 45 manufactured by Thor, Inc.; a defoamer such as Defoamer XZ manufactured by Nanjing Sixin Scientific and Technological Application Research Institute Co., Ltd; a thickener that includes hydroxypropyl methylcellulose such as Methocel™ E4M manufactured by The Dow Chemical Company; include a first calcium carbonate filler that includes dry ground marble such as Cal-white® manufactured by Imerys; a second calcium carbonate that includes dry ground calcium carbonate such as #10 White™ manufactured by Imerys; ceramic microspheres such as E-Spheres® SLG manufactured by Envirospheres PTY LTD; a pH color indicator such as o-cresolphthalein; an acrylic thickener such as Plasticryl™ AST-35 manufactured by Momentive Specialty Chemicals Inc.; a film former that includes 2,2,4-trimethyl-1,3-pentanediol monoisobutyrate such as Texanol™ Ester Alcohol manufactured by Eastman Chemical Company; a lightweight extender that includes expanded polymer microspheres such as Dualite® E065-135D™ manufactured by Henkel Corp.; and glass microspheres such as 3M™ Glass Bubbles K20 manufactured by 3M Company. Example 1 (see below), includes these ingredients in specific percentages by weight. The formulation provided in Example 1 is referred to as Formula ZA55867 and changes from purple to white to indicate the appropriate time for sanding and staining or painting.

EXAMPLE 1

| Raw Material | % (by wt.) | Description |
| --- | --- | --- |
| Water | 11.035 | — |
| AMP ™-95 | 1.315 | pH controller |
| Burco ® APR-4007 | 0.75 | surfactant |
| Burcosperse ® AP Liquid | 0.50 | dispersant |

-continued

| Raw Material | % (by wt.) | Description |
| --- | --- | --- |
| Propylene Glycol | 1.00 | freeze-thaw stabilizer |
| Encor ® DL 215 | 8.25 | SBR polymer |
| Encor ® DL 313 | 5.00 | SBR polymer |
| Acticide ® LA | 0.10 | bactericide |
| Acticide ® 45 | 0.10 | mildewcide |
| Defoamer XZ | 0.06 | defoamer |
| Methocel ™ E4M | 0.15 | thickener |
| Calwhite ® | 35.50 | calcium carbonate filler |
| #10 White ™ | 20.09 | calcium carbonate filler |
| E-Spheres ® SLG | 10.00 | ceramic microspheres |
| o-cresolphthalein | 0.35 | pH color indicator |
| Plasticryl ™ AST-35 | 2.30 | thickener |
| Texanol | 0.50 | film former |
| Dualite ® E065-135D ™ | 0.50 | lightweight extender |
| 3M ™ Glass Bubbles K20 | 2.50 | glass microspheres |
|  | 100.00 |  |

A second exemplary formulation includes the following ingredients: water; a pH controller such as AMP™-95 manufactured by The Dow Chemical Company; a wetting agent such as Burco® APR-4007 manufactured by Burlington Chemical Co., LLC; a dispersant or anionic detergent polymer such as Burcosperse® AP Liquid manufactured by Burlington Chemical Co., LLC); a freeze-thaw stabilizer such as propylene glycol; a first colored pigment such as Resotint Yellow Oxide TC a second colored pigment such as Resotint Umber 2TC; a first SBR polymer such as the modified styrene butadiene latex Encor® DL 215 manufactured by Arkema, Inc.); a second SBR polymer such as the modified styrene butadiene latex Encor® DL 313 manufactured by Arkema, Inc.; a bactericide that includes aqueous blends of chlorinated and non-chlorinated isothiazolinones and 2-bromo-2-nitro-1,3-propanediol such as Acticide® LA manufactured by Thor, Inc.; a mildewcide that includes liquid octylisothiazolinone such as Acticide® 45 manufactured by Thor, Inc.; a defoamer such as Defoamer XZ manufactured by Nanjing Sixin Scientific and Technological Application Research Institute Co., Ltd; a thickener that includes hydroxypropyl methylcellulose such as Methocel™ E4M manufactured by The Dow Chemical Company; include a first calcium carbonate filler that includes dry ground marble such as Calwhite® manufactured by Imerys; a second calcium carbonate that includes dry ground calcium carbonate such as #10 White™ manufactured by Imerys; ceramic microspheres such as E-Spheres® SLG manufactured by Envirospheres PTY LTD; a pH color indicator such as o-cresolphthalein; an acrylic thickener such as Plasticryl™ AST-35 manufactured by Momentive Specialty Chemicals Inc.; a film former that includes 2,2,4-trimethyl-1,3-pentanediol monoisobutyrate such as Texanol™ Ester Alcohol manufactured by Eastman Chemical Company; a lightweight extender that includes expanded polymer microspheres such as Dualite® E065-135D™ manufactured by Henkel Corp.; and glass microspheres such as 3M™ Glass Bubbles K20 manufactured by 3M Company. Example 2 (see below), includes these ingredients in specific percentages by weight. The formulation provided in Example 2 is referred to as Formula ZA55868 and changes from magenta to beige to indicate the appropriate time for sanding and staining or painting.

EXAMPLE 2

| Raw Material | % (by wt.) | Description |
| --- | --- | --- |
| Water | 11.035 | — |
| AMP ™-95 | 1.315 | pH controller |
| Burco ® APR-4007 | 0.75 | wetting agent |
| Burcosperse ® AP Liquid | 0.50 | dispersant |
| Propylene Glycol | 1.00 | freeze-thaw stabilizer |
| Resotint Yellow Oxide TC | 0.35 | colored pigment |
| Resotint Umber 2TC | 0.10 | colored pigment |
| Encor ® DL 215 | 8.25 | SBR polymer |
| Encor ® DL 313 | 5.00 | SBR polymer |
| Acticide ® LA | 0.10 | bactericide |
| Acticide ® 45 | 0.10 | mildewcide |
| Defoamer XZ | 0.06 | defoamer |
| Methocel ™ E4M | 0.15 | thickener |
| Calwhite ® | 35.05 | calcium carbonate filler |
| #10 White ™ | 20.09 | calcium carbonate filler |
| E-Spheres ® SLG | 10.00 | ceramic microspheres |
| o-cresolphthalein | 0.35 | pH color indicator |
| Plasticryl ™ AST-35 | 2.30 | thickener |
| Texanol | 0.50 | film former |
| Dualite ® E065-135D ™ | 0.50 | lightweight extender |
| 3M ™ Glass Bubbles K20 | 2.50 | glass microspheres |
|  | 100.00 |  |

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A composition for use as a wood-filler, comprising:
   (a) at least two styrene butadiene rubbers;
   (b) at least one pH color indicator, wherein the pH color indicator is operative to provide a visual indication that the wood filling composition is dry; and
   (c) microspheres, wherein the microspheres further include glass or ceramic, and wherein the microspheres are operative to provide durability and stainability to the wood-filling composition.

2. The composition of claim 1, wherein the at least one pH color indicator is o-cresolphthalein.

3. The composition of claim 1, further comprising at least one pigment.

4. The composition of claim 1, further comprising water; at least one pH controller; at least one wetting agent; at least one dispersant; at least one freeze-thaw stabilizer; at least one bactericide; at least one mildewcide; at least one defoamer; at least one thickener; at least one calcium carbonate filler; at least one film former; and at least one lightweight extender.

5. The composition of claim 4, wherein the at least one freeze-thaw stabilizer further includes propylene glycol; wherein the bactericide further includes an aqueous blend of chlorinated and non-chlorinated isothiazolinones and 2-bromo-2-nitro-1,3-propanediol; wherein mildewcide further includes liquid octylisothiazolinone; wherein the thickener further includes hydroxypropyl methylcellulose; wherein the calcium carbonate filler further includes dry ground marble or dry ground calcium carbonate; wherein the film former further includes 2,2,4-trimethyl-1,3-pentanediol monoisobutyrate; and wherein the lightweight extender further includes expanded polymer microspheres.

6. The composition of claim 1, wherein upon drying, the color of the composition changes from purple to white.

7. The composition of claim 1, wherein upon drying, the color of the composition changes from magenta to beige.

8. A composition for use as a wood-filler, comprising:
(a) at least two styrene butadiene rubbers;
(b) at least one pH color indicator, wherein the pH color indicator is operative to provide a visual indication that the wood filling composition is dry;
(c) microspheres, wherein the microspheres further include glass or ceramic, and wherein the microspheres are operative to provide durability and stainability to the wood-filling composition; and
(d) at least one pigment.

9. The composition of claim 8, wherein the at least one pH color indicator is o-cresolphthalein.

10. The composition of claim 8, further comprising water; at least one pH controller; at least one wetting agent; at least one dispersant; at least one freeze-thaw stabilizer; at least one bactericide; at least one mildewcide; at least one defoamer; at least one thickener; at least one calcium carbonate filler; at least one film former; and at least one lightweight extender.

11. The composition of claim 10, wherein the at least one freeze-thaw stabilizer further includes propylene glycol; wherein the bactericide further includes an aqueous blend of chlorinated and non-chlorinated isothiazolinones and 2-bromo-2-nitro-1,3-propanediol; wherein mildewcide further includes liquid octylisothiazolinone; wherein the thickener further includes hydroxypropyl methylcellulose; wherein the calcium carbonate filler further includes dry ground marble or dry ground calcium carbonate; wherein the film former further includes 2,2,4-trimethyl-1,3-pentanediol monoisobutyrate; and wherein the lightweight extender further includes expanded polymer microspheres.

12. The composition of claim 8, wherein upon drying, the color of the composition changes from purple to white.

13. The composition of claim 8, wherein upon drying, the color of the composition changes from magenta to beige.

* * * * *